Figure 1:
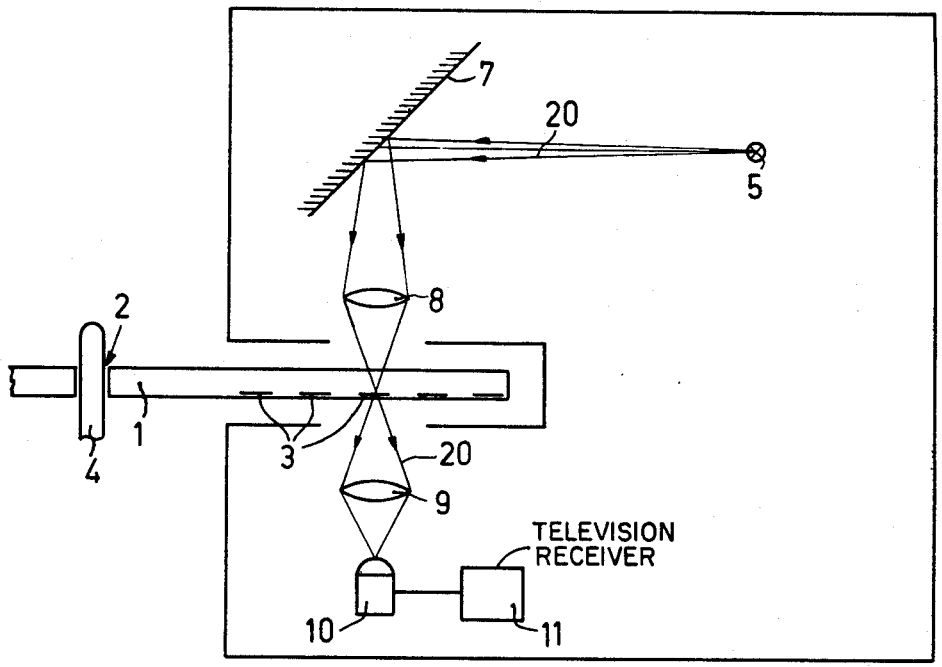

United States Patent [19]

Bouwhuis

[11] 4,010,317
[45] Mar. 1, 1977

[54] APPARATUS FOR READING A RECORD CARRIER IN WHICH INFORMATION, FOR EXAMPLE VIDEO AND/OR AUDIO INFORMATION, IS RECORDED IN AT LEAST ONE TRACK

[75] Inventor: Gijsbertus Bouwhuis, Eindhoven, Netherlands

[73] Assignee: U.S. Philips Corporation, New York, N.Y.

[22] Filed: Apr. 16, 1975

[21] Appl. No.: 568,708

Related U.S. Application Data

[63] Continuation of Ser. No. 340,977, March 14, 1073, abandoned.

[30] Foreign Application Priority Data

Mar. 29, 1972 Netherlands .................. 7204204

[52] U.S. Cl. ............... 358/127; 179/100.3 V; 250/201
[51] Int. Cl.² ............... H04N 5/76; G11B 7/00
[58] Field of Search ............ 179/100.3 V, 100.3 E; 178/6.7 R, 6.7 A, 6.6 R, 6.6 DD, DIG. 29, 7.6; 250/201, 202, 203 R, 204, 206, 555, 559, 208, 209, 216, 566, 568, 569, 570, 578, 234; 340/173 LM; 356/167, 46; 350/76, 77, 255

[56] References Cited

UNITED STATES PATENTS

| 3,198,880 | 8/1965 | Toulon ............... 179/100.3 V |
| 3,502,415 | 3/1970 | Hock ............... 356/167 |
| 3,530,258 | 9/1970 | Gregg et al. ............... 178/6.7 A |
| 3,553,455 | 1/1971 | Sato et al. ............... 250/201 |
| 3,571,598 | 3/1971 | Lombard ............... 250/204 |
| 3,596,101 | 7/1971 | Someya ............... 250/204 |
| 3,673,412 | 6/1972 | Olson ............... 179/100.3 V |
| 3,719,421 | 3/1973 | Poilleux et al. ............... 250/202 |
| 3,743,395 | 6/1973 | Preuss ............... 178/DIG. 29 |
| 3,764,759 | 10/1973 | Herringer et al. ............... 178/6.7 R |
| 3,833,769 | 9/1974 | Compann et al. ............... 179/100.3 V |

FOREIGN PATENTS OR APPLICATIONS

1,103,050   3/1961   Germany .................. 250/201

OTHER PUBLICATIONS

Frosch et al., IBM Tech. Disc. Bulletin, vol. 15, No. 2 7/72, pp. 504–505.

*Primary Examiner*—Raymond F. Cardillo, Jr.
*Attorney, Agent, or Firm*—Frank R. Trifari; Simon L. Cohen

[57] ABSTRACT

An apparatus for reading a record carrier in which information, for example video and/or audio information, is recorded in at least one track is described. By means of a detection system which comprises two radiation-sensitive detection elements which, viewed in the direction of length of the track, are arranged one behind the other so that they intercept two different parts of a radiation beam which has been modulated by the information of the track, positional errors of the plane of the track relative to a signal detection system can be detected.

8 Claims, 8 Drawing Figures

APPARATUS FOR READING A RECORD CARRIER IN WHICH INFORMATION, FOR EXAMPLE VIDEO AND/OR AUDIO INFORMATION, IS RECORDED IN AT LEAST ONE TRACK

This is a continuation of application Ser. No. 340,977, filed Mar. 14, 1973, now abandoned.

The invention relates to an apparatus for reading a record carrier in which information, for example, video and/or audio information, is recorded in at least one track, which apparatus comprises a source of radiation which provides a read beam and a radiation-sensitive signal detection system for converting the read beam modulated by the information into electric signals.

Such an apparatus is described in the U.S. Pat. No. 3,530,258. In the known apparatus in order to optically read a disk-shaped information carrier the latter is set into rotation by means of a spindle which passes through a center hole in the carrier, the read beam scanning a spiral track in a tangential direction. This track is followed in that the casing which accommodates the source of radiation and the detection system is radially displaced.

Owing to, for example, inaccuracies in the supporting system of the information carrier or the casing or owing to warping of the record carrier the track and the casing may perform relative movements in the axial direction also. In this case the signal detection system receives not only radiation from a part of the track to be read but also radiation from the surroundings of this part. As a result the modulation depth of the electric output signal from the signal detection system decreases while moreover, because no longer a single track but adjacent tracks also are illuminated, crosstalk occurs. The reduced modulation depth and the crosstalk prevent satisfactory signal detection.

In this specification, the term "tracks of a plate-shaped carrier" includes both a plurality of concentric record tracks and a single continuous spiral track.

Positional errors of the plane of the track to be read relative to the signal detection system may be detected, according to U.S. Ser. No. 229,291, filed Feb. 25, 1972 and now U.S. Pat. No. 3,833,769 by means of a position-determining system. This system comprises two gratings disposed one behind the other in the radiation path at a location behind the record carrier. The part of the record carrier surrounding the track part to be read, which part of the record carrier also has the structure of a grating, is imaged at a point between the two gratings. A comparison of the values of the electric output signals of two radiation-sensitive detectors each arranged at a location behind one of the gratings permits of determining whether the read beam is focussed on the plane of the track and in which direction a deviation occurs. The principle of focussing detection with the use of gratings may be modified in several manners. However, in all cases the detectors supply direct-voltage signals which cannot readily be processed by electronic means. It is true that alternating-voltage signals may be produced by inserting an oscillating mirror in the radiation path between the record carrier and the gratings, however, such an oscillating mirror requires additional mechanical and electrical provisions.

It is an object of the invention to provide an apparatus of the type described at the beginning of this specification in which the detection of positional errors of the plane of the track relative to the signal detection system is based on another principle and is performed without additional oscillating components parts. According to a feature of the invention the apparatus is provided with a position-determining system which comprises two radiation-sensitive detection elements and serves to determine the position of the plane of a track relative to the signal detection system and with electronic means for processing the electric output signals of the detection elements to produce a control signal, the detection elements, viewed in the direction of length of the track, being arranged one behind the other so that they intercept different parts of a radiation beam which has been modulated by the information of the track.

The apparatus according to the invention is based on the recognition that the variations between areas having different optical properties, which variations occur in the optical structure of the information, may be used by way of knife edges in a manner similar to the Foucault knife-edge test. Furthermore the movement of the optical structure of the information is utilized to achieve dynamic detection.

While in the position-determining system according to the aforementioned prior proposition at a given instant a large number of tracks situated around the track part to be read are imaged and the amplitudes of the electric output signals of the detection elements are compared, in the apparatus according to the invention at a given instant only a small part of one track is imaged and the phases of the electric output signals of the detection elements are compared.

It should be noted that the use of two detectors for measuring the displacement of a graduated sacle in a direction at right angles to the plane of the detectors is described in U.S. Pat. No. 3,502,425. In the apparatus described in this patent, a scanning mark is to be periodically moved relative to the graduated scale, requiring a separate driving system, whereas one of the advantages of the apparatus according to the present invention is that no additional oscillation need be generated.

In an apparatus according to the invention the radiation beam of the position-determining system preferably also is the read beam, the detection elements of the position determining system forming parts of the signal detection system.

In a first embodiment of an apparatus according to the invention a control signal is derived in the electronic means from those components of the output signals of the detection elements the frequencies of which correspond to those of the video signals. In this apparatus only positional errors within a small region can accurately be determined.

To enable positional errors to be determined over a larger region, according to a second embodiment of an apparatus according to the invention a control signal may be derived in the electronic means from those components of the output signals of the detection elements the frequencies of which are considerably lower than that of the video signals.

To ensure that in this embodiment the region within which positional errors can be determined is sufficiently large, according to another aspect of the invention there is provided on the record carrier, preferably at the locations which correspond to the frame flyback periods in the video signal, an additional structure having optical details which are considerably greater than the optical details of the video and/or audio information.

Advantageously, in an apparatus according to the invention there is inserted in the path of the radiation beam at a point preceding the detection elements an additional lens system for forming images of the pupil of a first lens system inserted in the radiation path at a point succeeding the record carrier on the detection elements, these images being stationary with respect to the detection elements.

In this embodiment the two detection elements may constitute a single detector in integrated circuit form.

Figure 2:
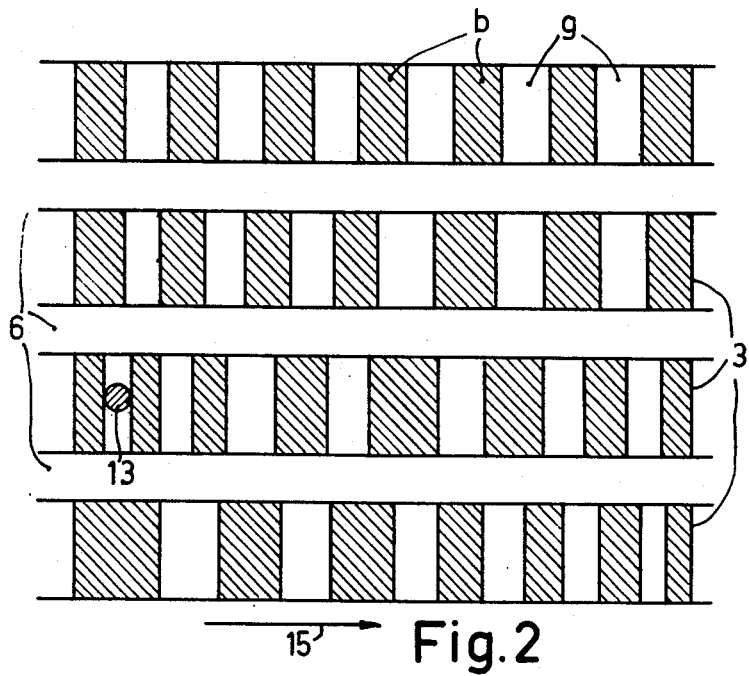
Figure 3:
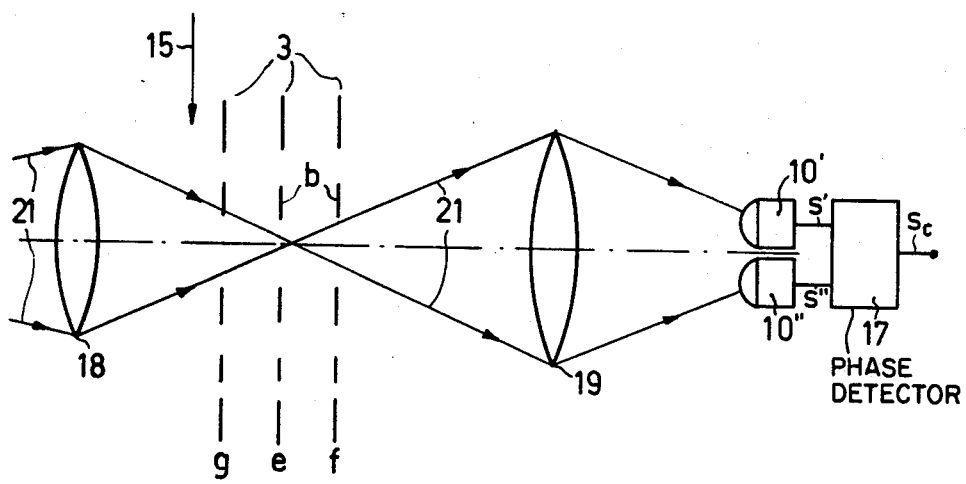
Figure 4:
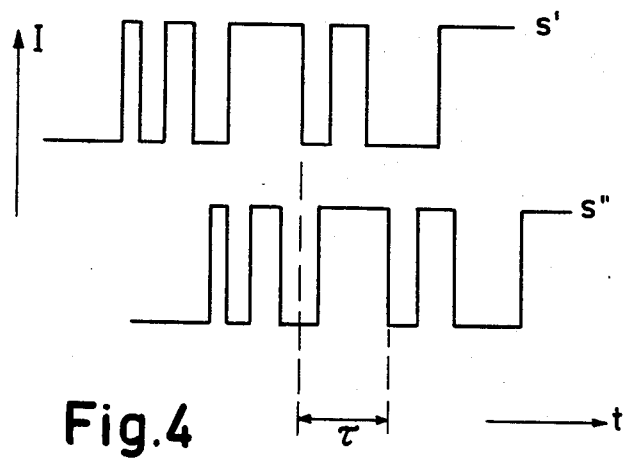
Figure 6:
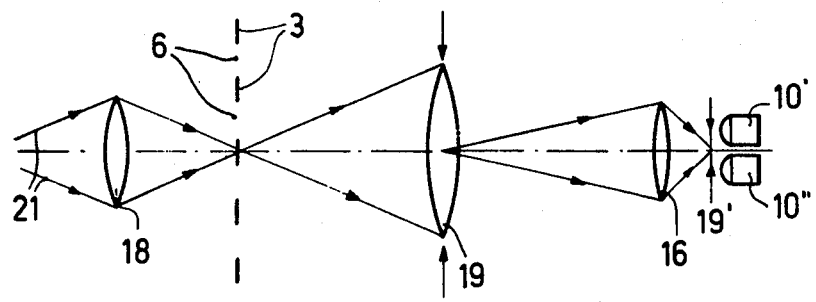
Figure 7:
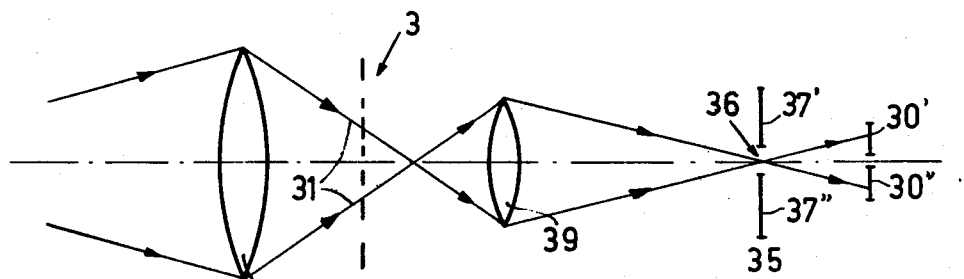
Figure 8:
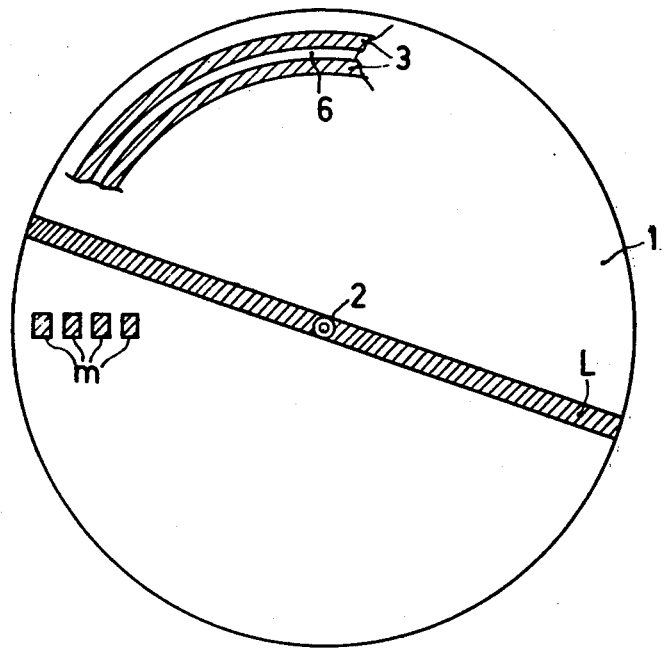

Embodiments of the invention will now be described by way of example, with reference to the accompanying diagrammatic drawings, in which:

FIG. 1 shows schematically an optical read apparatus according to a prior proposition, FIG. 2 is a plan view of part of the optical structure to be read, FIG. 3 illustrates the principle of a position-determining system according to the invention, FIG. 4 shows wave forms of the signals obtained by means of the system shown in FIG. 3, FIGS. 5, 6 and 7 show embodiments of an apparatus according to the invention, and FIG. 8 shows a record carrier provided with additional optical structures according to the invention.

In the read apparatus shown in FIG. 1 a disk-shape record carrier 1 shown in radial section is rotated by means of a spindle 4 which is driven by a motor, not shown, and passes through a center hole 2 in the record carrier. A beam of radiation 20 emitted by a source of radiation 5 is reflected by a plane mirror 7 towards the record carrier. The read beam 20 is focussed by a lens 8 onto the plane of tracks 3 which in this case are disposed on the lower surface of the record carrier. The read beam 20 modulated by a track is concentrated by a codndenser 9 onto a radiation-sensitive detector 10. The ouput of the detector 10 may be connected to known electronic means 11 for converting the electric output signal of the detector into pictures and sound.

The lens 8 has to satisfy stringent requirements, because the order of magnitude of the image of the radiation source formed by this lens must be equal to that of the smallest dimension within the optical structure of the recording. FIG. 2 is a plan view of a small part of this optical structure. An arrow 15 indicates the direction in which the record carrier is moved. The structure comprises a plurality of tracks 3 which each comprise blocks $b$ alternating with areas $g$. The tracks are separated from one another by neutral stripes 6. The tracks may be disposed on the information carrier in parallel arrangement, i.e. so as to be concentric. Alternatively, a spiral track may be used, so that there is only a single continuous track. The blocks of a track may, for example, be radiation absorbing, in which case the areas and the neutral stripes are radiation transmitting. In this case the beam of radiation which passes through the record carrier is influenced in amplitude. As an alternative, the blocks and areas may be disposed on different levels in the record carrier so as to form a crenellated structure. Such a structure enables the phase of a radiation beam to be influenced and hence is often referred to as a phase structure. Furthermore both reflection and transmission operation is possible. The lengths of the blocks and areas represent the stored information. A beam of radiation which has been modulated by the track exhibits pulse-shaped variations in time in accordance with the sequence of blocks and areas in the track.

In an embodiment of an optical structure the mean period in the direction of length of a track was 4 $\mu$m and the minimum length in a track was 2 $\mu$m, so that an image 13 of the source 5 had to be of the order of 2 $\mu$m. This requires the plane of the optical structure to lie within the depth of focus of for example, 1 $\mu$m of the lens. Hence any displacement of the optical structure in a direction at right angles to the plane of the track must be detected to permit of ensuring that the distance between the plane of the track and the image of the radiation source 5 remains less than 1 $\mu$m.

FIG. 3 shows schematically how focussing errors can be detected according to the invention.

In FIG. 3 reference numeral 19 denotes a condenser lens. Two radiation-sensitive detectors 10' and 10'' are arranged side by side behind the condenser. The detectors intercept radiation emanating from different part of the exit pupil of the condenser lens 19. The optical structure of a track 3, which at a given instant is being read, is shown in tangential section in front of the lens 19. In the apparatus shown in FIG. 3 the plane of the record extends in a direction at right angles to the plane of the drawing. The axis of rotation of the record carrier is parallel to the plane of the drawing and at right angles to the track 3. This axis may lie either in front of or behind the plane of the drawing. The track 3 moves with respect to the optical system (18, 19) in the direction indicated by the arrow 15.

When the track 3 is at the correct location ($e$) in the optical system, the read beam 20 is exactly focussed on it. The rays intercepted by the separate detectors 10' and 10'' then emanate from the same point of the track and hence are equal, so that the detectors provide equal output signals. If now the track 3 and hence the optical structure is moved towards the condenser 19, for example to the position $f$, the detectors receive rays which emanate from different parts of the optical structure of the track. Owing to the movement of the record carrier both detectors see each point of the entire structure, however, a given point is seen by one detector at an earlier instant than by the other. In the case of the position $f$ shown of the track 3 the appearance of a block $b$ will be detected by the detector 10' at an earlier instant than by the detector 10''.

In FIG. 4 the intensities (I) of the output signals S' and S'' from the detectors 10' and 10'' respectively are shown as functions of time ($t$) for the case in which the track 3 is in the position $g$. Between the signals S' and S'' there is a time delay $\tau$ the magnitude of which depends upon the distance between the positions $e$ and $g$. The time delay $\tau$ is shown greatly exaggerated for clarity.

If the track 3 is in the position $f$, the signal S'' will be delayed with respect to the signal S'.

The signals S' and S'' are applied to a phase detector 17 in which the time difference between the signals is converted into a control signal. This control signal $S_c$ enables the focussing of the lens 18 to be adjusted. Neither the electronic processing of the signals nor the adjustment of the focussing form part of the invention and hence they will not be described further.

It should be noted that the use of the position-determining system described is not restricted to a record carrier having an optical structure comprising discrete blocks and areas. The position-determining system according to the invention may also be used for determining the position of a record carrier having a continuous optical structure, for example a sinusoidal structure.

Also, the shape of the record carried need not satisfy particular requirements to enable the position-determining system according to the invention to be used. This position-determining system may in general be used for any record carrier which in the reading process is moved with respect to the signal detection system in a plane at right angles to the read beam, while the plane of the record can move in the direction of the read beam.

Figure 5:
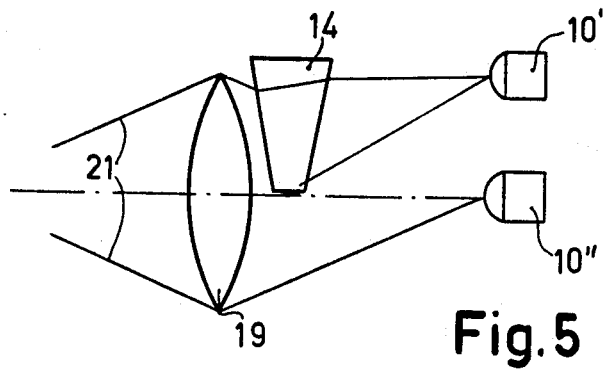

The detection elements 10' and 10" need not be disposed side by side, but they may alternatively be spaced by some distance from one another, for example when a deflecting element is provided in the exit pupil of the condenser lens 19. in the embodiment shown in FIG. 5 this deflecting element is in the form of a wedge 14. Also, a plane mirror may be disposed in one half or in each half of the exit pupil of the lens 19, permitting the detection elements to be oriented at different angles relative to the optical axis of the system (18, 19).

In the apparatuses shown in FIGS. 3 and 5 the detection elements 10' and 10" each receive one half of a beam 21 which is divided into two halves by a plane containing the optical axis of the system (18, 19) and extending at right angles to the direction of length of the track 3. However, the detection elements may also be arranged so as to intercept only parts of these halves. The sensitivity of the focussing detection device increases as the spacing between these parts is greater.

When in the apparatus shown in FIG. 3 the record carrier is displaced in a direction at right angles to the plane of the drawing, i.e. in the radial direction of the disk-shaped carrier, the image may be displaced over the detecting elements by means of a rotary mirror inserted in the radiation path. Because the sensitivity of the surfaces of these elements may locally differ, an error signal may be produced in spite of the fact that the plane of the track is correctly located in the read system. Moreover, in the case of incorrect radial displacements an image of the information carrier may be formed at a point wide of the detection elements.

According to the invention the said disadvantages may be avoided by inserting an additional imaging lens in the path of the radiation at a point preceding the detecting elements as is shown in FIG. 6. In FIG. 6 the optical structure which comprises tracks 3 and neutral stripes 6 is shown in radial section. A lens 16 forms a reduced image 19' of the exit pupil of the lens 19. Detection elements 10' and 10" are again arranged in the plane of the image 19'. Irrespective of the movement of the optical structure its image will always fall on the same small areas of the detecting elements.

To prevent excessive radiation losses in the apparatus shown in FIG. 6 the elements 10' and 10" must be disposed in close proximity to one another. For this purpose a detector in integrated-circuit form comprising two detector halves may be used which can be manufactured by means of known integrated-circuit techniques.

The position-determining systems shown in FIGS. 3, 5 and 6 may be used in the read apparatus shown in FIG. 1 in which the read beam is focussed onto the plane of the track. The elements of the locating system may then be combined with those of the read apparatus so that the read beam 20 coincides with the radiation beam 21. For this purpose, in the apparatus shown in FIG. 1 the detector 10 need only be replaced by the two detecting elements 10' and 10" of the systems shown in FIGS. 3, 5 and 6. Each of these elements delivers a complete electric signal, and a comparison of the phases of these signals permits of obtaining information about the position of the plane of the tracks relative to the signal detection system.

The position-determining system according to the invention may also be used in read apparatuses in which the record carrier is illuminated by a wide read beam, while the radiation-sensitive area of the signal detection system is so small as to intercept only a beam of radiation having a diameter of the size of the smallest detail in the track. In such an apparatus also the read beam may be made to coincide with the radiation beam of the locating system. This situation is shown in FIG. 7.

In the apparatus shown in this Figure a large-diameter radiation beam 31 falls on a comparatively large part of the optical structure, only one track 3 of which is shown. Behind this part is arranged an objective 39 which forms an image of this part on the detection system. This system comprises a diaphragm 35 and two radiation-sensitive detectors 30' and 30" arranged at a certain distance behind the diaphragm. The size of a diaphragm slit 36 is matched to the smallest detail of the optical structure. The two detection elements 30' and 30" intercept rays which emanate from different parts of the slit.

Part of the optical structure of the record carrier, which part has a grating-shaped structure, is imaged on both halves 37' and 37" of the diaphragm 35. Designing these halves as grating-shaped detection elements enables not only the axial position but also the radial position of the record carrier relative to the signal detection system to be determined in the manner described in U.S. Ser. No. 229,291, filed Feb. 25, 1972 and now U.S. Pat. No. 3,833,769. The insertion of an additional lens in the path of the radiation at a point succeeding the slit 36 permits of obtaining, in the apparatus shown in FIG. 7 also, stationary images of the exit pupil of the lens 39 on the detection element in a manner similar to that used in the apparatus shown in FIG. 6.

The invention has been described with reference to an optical structure which is composed of radiation-absorbing and radiation-transmitting areas. Obviously, it may also be used with an optical structure composed of radiation-reflecting and radiation-absorbing areas. For example, a half-silvered mirror may be inserted in the path of the radiation beam between the source and the record carrier. This mirror deflects the radiation reflected from the record carrier. The deflected radiation may then be processed in any of the aforedescribed manners.

Hereinbefore it has been assumed that the radiation beam 21 is modulated by the blocks and areas of one track only. The dimensions of these blocks and areas in the direction of length of the track are very small with a minimum of, for example, 2 $\mu$m. If the locating system is to operate satisfactorily, the diameter of the radiation beam at the location of the track must be smaller than the minimum dimension in the direction of length of the track. The displacement of the track relative to the optical system (18, 19) which can be accurately detected is comparatively small. The track is allowed to move towards the lens 19 or away from the lens 19 through a distance at most equal to the depth of focus of the lens 18. The depth of focus depends upon the size of the detail being viewed. The depth of focus of a lens having a numerical aperture of 0.3 is about 7 $\mu$m for a detail of 2 $\mu$m, so that the operating range of the position-determining system under such conditions is about 14 $\mu$m.

According to the invention this operating range may be expanded in that, especially for axial position-determining an additional optical structure having large details (of, for example, from 20 to 100 $\mu$m) is provided on the record carrier. Because at the locations which correspond to the frame flyback periods in the video signal the information density of the carrier is small, the additional optical structure is preferably provided at these locations.

If per revolution of the record carrier one picture is read, i.e. if the information of one picture is stored in one track, the locations of the rrame flyback periods lie in the same sector of a circle in the various tracks. The additional optical structure may then simply consist of a wide diametrical line. In FIG. 8, which is a plan view of a record carrier according to the invention, this line is designated by L. The tracks are denoted by 3 and an intermediate stripe carrying no information is denoted by 6. Alternatively, extra great regions $m$ (in FIG. 8) may be included in the tracks. Furthermore the record carrier may be provided with several diametrical lines L having different widths or with several areas $m$ having different widths in one track.

When the carrier makes 25 revolutions per second the line L or the areas $m$ are read at a frequency of 50 Hz. This frequency is of an order of magnitude widely different from that of the signals which are produced by modulation of the beam of radiation by the optical structure of the video information in a track (frequency about 4 MHz). When using a record carrier according to the invention in the read system described, signals having high-frequency and low-frequency components appear at the outputs of the detection elements. These components may be separated from one another by filters in the electronic processing device and used to produce separate signals for fine control and coarse control. The possibility of detecting over a wider range is of particular importance to enable a focussing deviation, which may be produced when a record carrier is placed in the read apparatus or when this apparatus is subjected to a shock, to be rapidly reduced to a value which falls within the range of fine control.

What is claimed is:

1. In an apparatus for reading a record carrier in which information is recorded in at least one optically interogatable longitudinally moving track, a focus detection system comprising a source of radiation providing a read beam of radiation, at least two optical detection elements spaced along the longitudinal direction of said track for converting optically modulated light into electrical signals, a lens system means in the path of said read beam for focussing said read beam to a radiation spot on said track that is substantially the same size as the smallest recorded detail on said record carrier whereby said information on said track modulates said read beam and for converging the radiation beam modulated by said track towards said two optical detection elements, whereby said optical detection elements receive radiation modulated by different portions of said track when said read beam is improperly focussed, and a phase detector connected to said at least two optical detection elements for measuring the phase difference between said electrical signals from said optical detection elements, said phase difference indicating the extent of the improper focus of said read beam on said track.

2. Apparatus as recited in claim 1, further comprising a second lens system means positioned in the path of said radiation modulated by said track intermediate said first lens system means and said optical detection elements for forming a stationary image of a portion of said first lens system means proximate said detection elements.

3. Apparatus as claimed in claim 1, wherein the two detection elements are in integrated circuit form.

4. Apparatus as claimed in claim 1, wherein the phase detector comprises means for deriving a control signal from those components of the output signals of the detection elements the frequencies of which are considerably lower than that of the video information.

5. Apparatus as claimed in claim 4, wherein the record carrier has at least one track of video and/or audio information recorded as a coded optical structure, said track including additional optical structures at locations corresponding to frame flyback periods, said additional optical structures having optical details which are considerably greater than those of the video and/or audio information coded optical structure.

6. Apparatus as claimed in claim 1, wherein at least one of the focus-determining detection elements forms part of the signal detection system.

7. Apparatus as claimed in claim 6, further comprising a diaphragm provided with an opening which matches the smallest detail to be expected in the optical structure of the record carrier in the path of the read beam at a point preceding the detection elements.

8. Apparatus as claimed in claim 7, wherein the parts of the diaphragm surface on either side of the slit which face the record carrier are in the form of grating-shaped detectors.

* * * * *